(12) United States Patent
Matsuda et al.

(10) Patent No.: US 8,920,522 B2
(45) Date of Patent: Dec. 30, 2014

(54) BATTERY MANUFACTURING METHOD AND BATTERY

(75) Inventors: Takeshi Matsuda, Kyoto (JP); Masakazu Sanada, Kyoto (JP); Kenta Hiramatsu, Kyoto (JP)

(73) Assignee: Dainippon Screen MFG. Co., Ltd. (JP)

( * ) Notice: Subject to any disclaimer, the term of this patent is extended or adjusted under 35 U.S.C. 154(b) by 650 days.

(21) Appl. No.: 12/888,070

(22) Filed: Sep. 22, 2010

(65) Prior Publication Data

US 2011/0070479 A1 Mar. 24, 2011

(30) Foreign Application Priority Data

Sep. 24, 2009 (JP) ................................ 2009-218524
Mar. 19, 2010 (JP) ................................ 2010-063739

(51) Int. Cl.
*H01M 10/0585* (2010.01)
*H01M 10/0525* (2010.01)
*H01M 10/0565* (2010.01)

(52) U.S. Cl.
CPC ...... *H01M 10/0585* (2013.01); *H01M 10/0525* (2013.01); *H01M 10/0565* (2013.01); *Y02E 60/122* (2013.01)
USPC .......... 29/623.5; 29/623.1; 429/209; 429/233

(58) Field of Classification Search
USPC ................... 29/623.1, 623.5; 429/209, 233
See application file for complete search history.

(56) References Cited

U.S. PATENT DOCUMENTS

| | | | |
|---|---|---|---|
| 6,797,019 B2 * | 9/2004 | Takeuchi et al. | ............. 29/623.5 |
| 7,077,334 B2 * | 7/2006 | Sachs et al. | ..................... 239/11 |
| 7,579,112 B2 | 8/2009 | Chiang et al. | |
| 2003/0099884 A1 | 5/2003 | Chiang et al. | |
| 2004/0072067 A1 | 4/2004 | Minami et al. | |
| 2007/0026312 A1 | 2/2007 | Imachi et al. | |
| 2007/0072083 A1 * | 3/2007 | Ikuta et al. | ..................... 429/246 |
| 2007/0172735 A1 * | 7/2007 | Hall et al. | ..................... 429/233 |
| 2007/0259271 A1 | 11/2007 | Nanno et al. | |
| 2010/0003603 A1 | 1/2010 | Chiang et al. | |

FOREIGN PATENT DOCUMENTS

| | | |
|---|---|---|
| CN | 1864298 | 11/2006 |
| JP | 6-295740 | 10/1994 |
| JP | 11-25956 | 1/1999 |
| JP | 2001-210360 | 8/2001 |

(Continued)

OTHER PUBLICATIONS

Office Action dated Jul. 25, 2012 in corresponding U.S. Appl. No. 13/155,020 containing an obviousness double-patenting rejection over claims in this application.

(Continued)

*Primary Examiner* — Patrick Ryan
*Assistant Examiner* — Julian Anthony
(74) *Attorney, Agent, or Firm* — Ostrolenk Faber LLP

(57) ABSTRACT

A negative-electrode active material layer having an uneven pattern is formed on a surface of a copper foil as a negative-electrode current collector by applying an application liquid by a nozzle-scan coating method. Subsequently, an application liquid containing a polymer electrolyte material is applied by a spin coating method, thereby forming a solid electrolyte layer in conformity with the uneven pattern. Subsequently, an application liquid is applied by a doctor blade method, thereby forming a positive-electrode active material layer whose lower surface conforms to the unevenness and whose upper surface is substantially flat. A thin and high-performance all-solid-state battery can be produced by laminating an aluminum foil as a positive-electrode current collector before the application liquid is cured.

13 Claims, 13 Drawing Sheets

(56) References Cited

FOREIGN PATENT DOCUMENTS

| | | |
|---|---|---|
| JP | 2004-179136 | 6/2004 |
| JP | 2005-116248 | 4/2005 |
| JP | 2005-525674 | 8/2005 |
| JP | 2007-35589 | 2/2007 |
| KR | 10-2008-0099350 | 11/2008 |
| WO | 03/012908 | 2/2003 |

OTHER PUBLICATIONS

Office Action for corresponding Taiwanese Application No. 099147020 dated Jun. 3, 2013.

* cited by examiner

F I G. 9
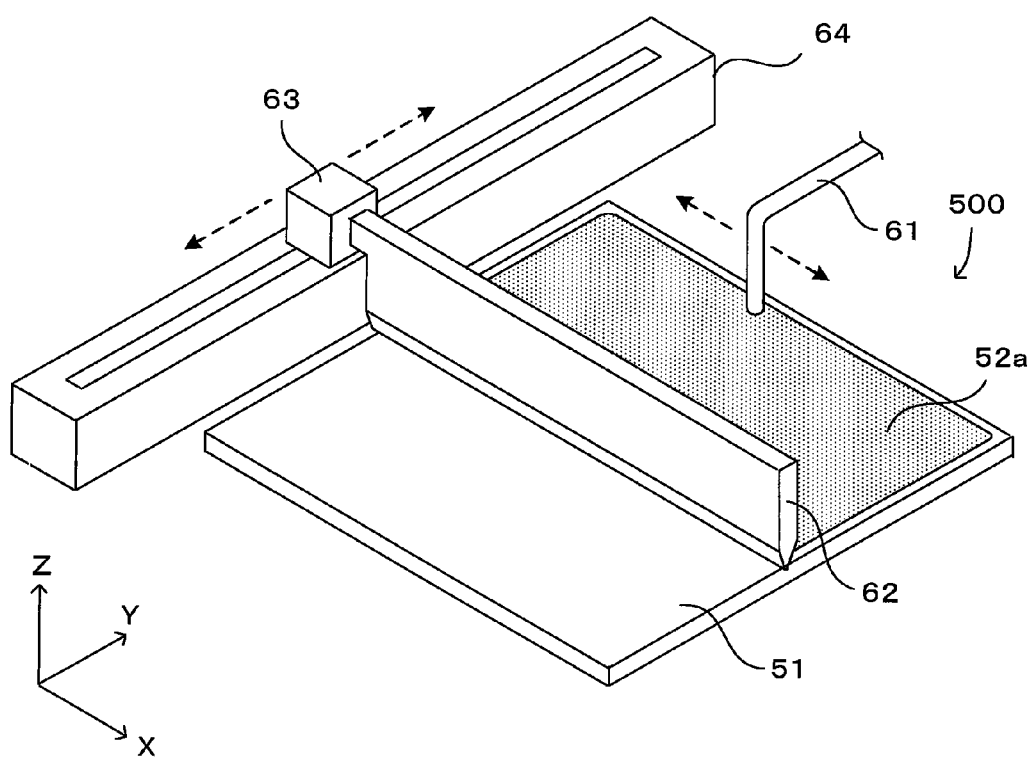

F I G. 1 3
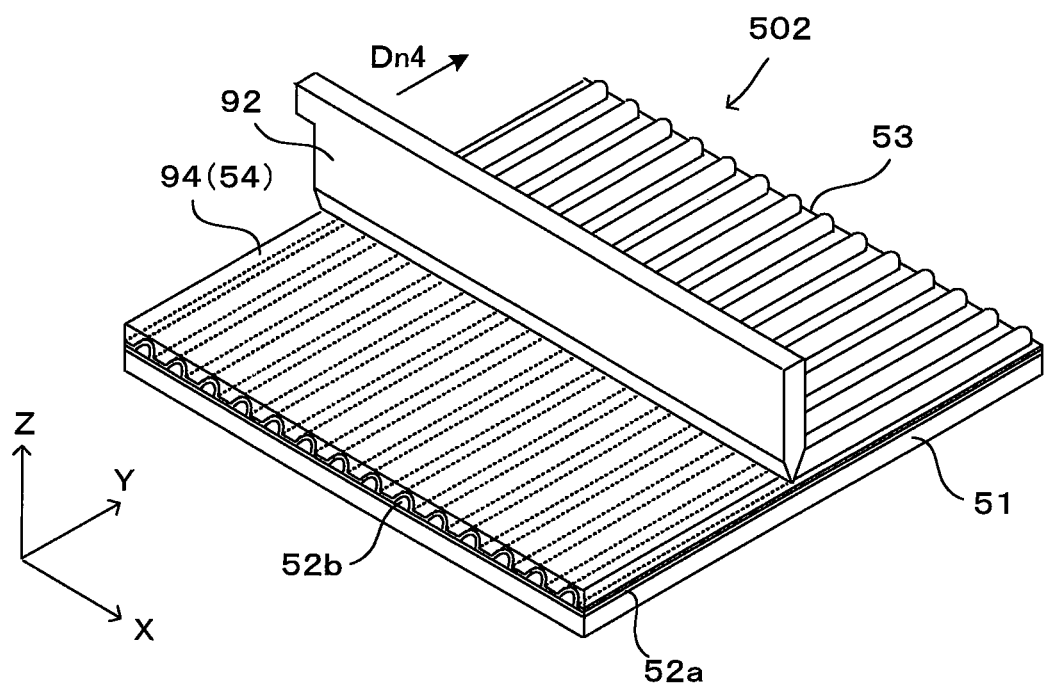

BATTERY MANUFACTURING METHOD AND BATTERY

CROSS REFERENCE TO RELATED APPLICATION

The disclosure of Japanese Patent Applications enumerated below including specifications, drawings and claims is incorporated herein by reference in its entirety:
No. 2009-218524 filed on Sep. 24, 2009; and
No. 2010-063739 filed on Mar. 19, 2010.

BACKGROUND OF THE INVENTION

1. Field of the Invention

The invention relates to a battery structured such that positive and negative active material layers face each other with an electrolyte layer therebetween and a manufacturing method for such a battery.

2. Description of the Related Art

Conventionally, as a method for producing a chemical battery such as a lithium-ion battery, a technology for superimposing metal foils as current collectors respectively having positive-electrode and negative-electrode active materials attached thereto with a separator disposed therebetween and impregnating the separator with an electrolyte solution has been known. However, a battery including a volatile organic solvent as an electrolytic solution needs to be carefully handled. Further, for required further miniaturization and higher output, a technology for producing an all-solid-state battery by microfabrication using a solid electrolyte in place of an electrolytic solution has been and is being proposed in recent years.

For example, JP2005-116248A discloses a technology for forming an active material layer having an uneven surface on a metal foil, which will become a current collector, by an ink jet method and successively three-dimensionally laminating a solid electrolyte layer and another active material layer by the ink jet method so as to flatten the unevenness.

In the above prior art, the above space structure is obtained by laminating a multitude of layers mixedly including different functional layers such as the positive and negative active material layers and the solid electrolyte layer formed by one printing process by recoating. However, this technology has the following problems.

Firstly, the ink-jet method can form a complicated structure as above with high controllability since only a small amount of ink is discharged, whereas it requires a long time for production since recoating needs to be performed a plurality of times to obtain a desired space structure and is low in productivity. Secondly, it is difficult to separate the respective functional layers. In other words, the functional layers are mixed due to the contact of the ink containing mutually different materials to make boundaries between the respective functional layers unclear, leading to a possibility of reducing performance of the battery. Although drying is performed after every printing process in the above prior art, this further reduces productivity and increases production cost. Even if the mixing of the respective layers formed by the respective printing processes should be prevented, the mixing of a plurality of functional layers formed adjacent to each other by one printing process cannot be prevented.

SUMMARY OF THE INVENTION

In view of the above problems, an object of the invention is to provide a low-cost and high-performance battery and a technology capable of producing the battery with high productivity.

In order to accomplish the above object, the invention is directed to a battery manufacturing method, comprising a first active material layer forming step of forming a first active material layer having a specified uneven pattern by applying a first application liquid containing a first active material on a surface of a base material; an electrolyte layer forming step of forming an electrolyte layer having unevenness substantially in conformity with the uneven pattern on a surface of a laminated body, which is formed by laminating the first active material layer on the surface of the base material, by applying a second application liquid containing a polymer electrolyte after the first active material layer forming step; and a second active material layer forming step of forming a second active material layer having a substantially flat surface opposite to a surface touching the electrolyte layer by applying a third application liquid containing a second active material on a surface of the electrolyte layer after the electrolyte layer forming step.

In the invention constituted as above, the first active material layer having the uneven pattern is formed on the base material by application, then the electrolyte layer in conformity with this unevenness is formed by application and further the second active material layer is formed by application. Since the respective functional layers, i.e. the first active material layer, the electrolyte layer and the second active material layer are successively completed in the respective operation steps in this way, recoating is not required, the respective operation steps are simple and a time required for the entire process is short. Therefore, a battery with high productivity and good performance can be produced at a low cost.

Further, in order to accomplish the above object, this invention is directed to a battery having a structure formed by laminating a base material; a first active material layer formed by curing an application liquid containing a first active material and applied to a surface of the base material, and having a surface with a specified uneven pattern; an electrolyte layer containing a polymer electrolyte and having unevenness substantially in conformity with the uneven pattern of a laminated body formed by laminating the first active material layer on the surface of the base material; a second active material layer containing a second active material and having one surface touching the electrolyte layer and substantially in conformity with the unevenness of the electrolyte layer and another surface which is opposite to the one surface and substantially flat; and a current collector layer corresponding to the second active material.

In the invention constituted as above, the first active material layer whose surface area is increased by having the uneven surface and the second active material layer face each other via the electrolyte layer in conformity with the unevenness. Thus, an electrolyte liquid containing an organic solvent is not necessary and a small size and a high output can be obtained. In this way, according to this invention, a battery with good performance can be obtained and this battery can be produced at a low cost and with high productivity.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 9 is a drawing which diagrammatically shows a state of application of the first negative-electrode active material by the knife coating method, FIG. 13 is a drawing which diagrammatically shows a state of application of the positive-electrode active material by the knife coating method.

DETAILED DESCRIPTION OF THE PREFERRED EMBODIMENTS

First Embodiment

Figure 1A:
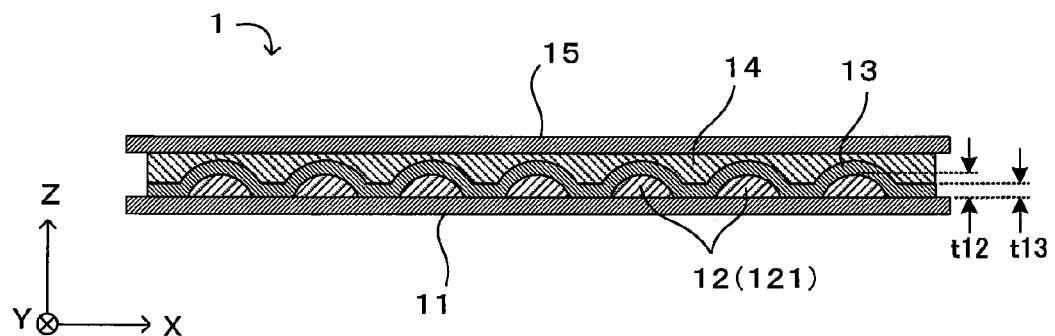
FIGS. 1A and 1B are drawings which show a schematic structure of a first embodiment of a lithium-ion battery.
Figure 1B:
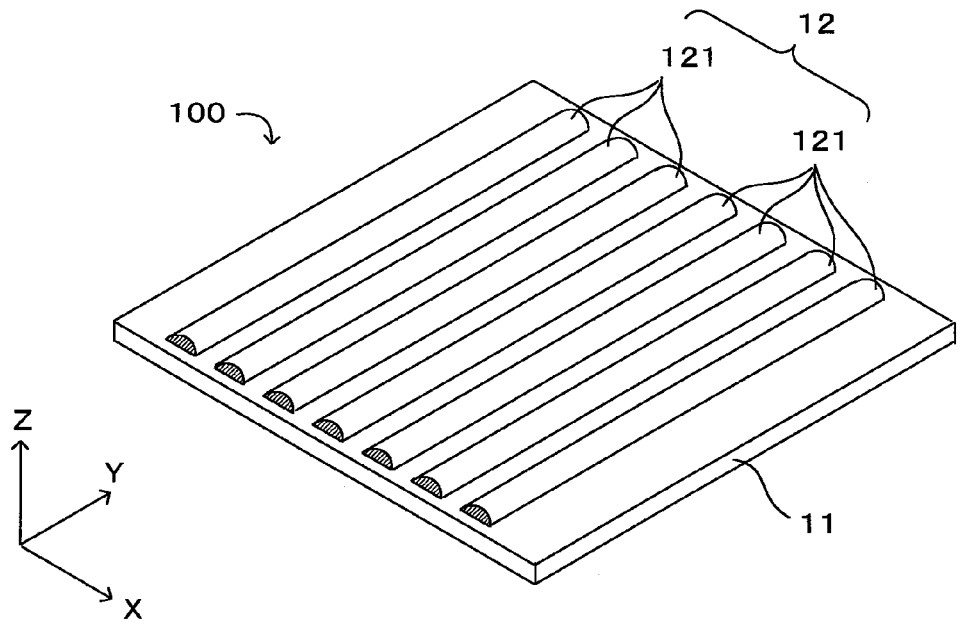

FIGS. 1A and 1B are drawings which show a schematic structure of a first embodiment of a lithium-ion battery. More specifically, FIG. 1A is the drawing which shows a cross-sectional structure of a lithium-ion battery module 1 as an example of a battery produced by a first embodiment of a manufacturing method according to this invention. This lithium-ion battery module 1 has such a structure that a negative-electrode active material layer 12, a solid electrolyte layer 13, a positive-electrode active material layer 14 and a positive-electrode current collector 15 are successively laminated on a negative-electrode current collector 11. In this specification, X-, Y- and Z-coordinate directions are respectively defined as shown in FIG. 1A.

FIG. 1B is a perspective view which shows a structure when the negative-electrode active material layer 12 is formed on a surface of the negative-electrode current collector 11. As shown in FIG. 1B, the negative-electrode active material layer 12 has a line-and-space structure in which a multitude of stripe-shaped pattern elements 121 extending in a Y-direction are arranged at regular intervals in an X-direction. On the other hand, the solid electrolyte layer 13 is a thin film with a substantially constant thickness formed by a solid electrolyte, and uniformly covers the substantially entire upper surface of a laminated body 100 in such a manner as to conform to the unevenness of the surface of the laminated body 100 in which the negative-electrode active material layer 12 is formed on the negative-electrode current collector 11 as described above.

The lower surface of the positive-electrode active material layer 14 has an uneven structure in conformity with the unevenness of the upper surface of the solid electrolyte layer 13, whereas the upper surface of the positive-electrode active material layer 14 is a substantially flat surface. The positive-electrode current collector 15 is laminated on the upper surface of the positive-electrode active material layer 14 formed to be substantially flat in this way, whereby the lithium-ion battery module 1 is formed. A lithium-ion battery, which is an all-solid-state battery, is formed by appropriately arranging tab electrodes or laminating a plurality of modules on this lithium-ion battery module 1.

Here, known materials for lithium-ion batteries can be used as materials for the respective layers. For example, an aluminum foil and a copper foil can be respectively used as the positive-electrode current collector 15 and the negative-electrode current collector 11. Further, $LiCoO_2$ (lithium cobaltate), $LiMnO_2$ (lithium manganese oxide) and mixtures of these can be, for example, used as a positive-electrode active material. Mixtures of $Li_4Ti_5O_{12}$ (lithium titanate) and graphite can be, for example, used as a negative-electrode active material. Further, a borate ester polymer electrolyte can be, for example, used as the solid electrolyte layer 13. Note that the materials for the respective functional layers are not limited to these.

The lithium-ion battery module 1 having such a structure is thin and flexible. By forming the negative-electrode active material layer 12 to have an uneven space structure as shown, its surface area with respect to its volume is made larger. Thus, the area of the surface facing the positive-electrode active material layer 14 via the thin solid electrolyte layer 13 can be increased to ensure high efficiency and high output. In this way, the lithium-ion battery having the above structure can be small in size and have high performance.

Next, a method for producing the above lithium-ion battery module 1 is described. Conventionally, a module of this type has been formed by laminating thin film materials corresponding to respective functional layers, but there is a limit in increasing the density of the module by this manufacturing method. Further, with a manufacturing method employing the above prior art ink jet method, production takes time due to many operation steps and it is difficult to separate the respective functional layers. In contrast, with the manufacturing method described below, the lithium-ion battery module 1 having the above structure can be produced with a smaller number of operation steps using an existing processing apparatus.

Figure 2:
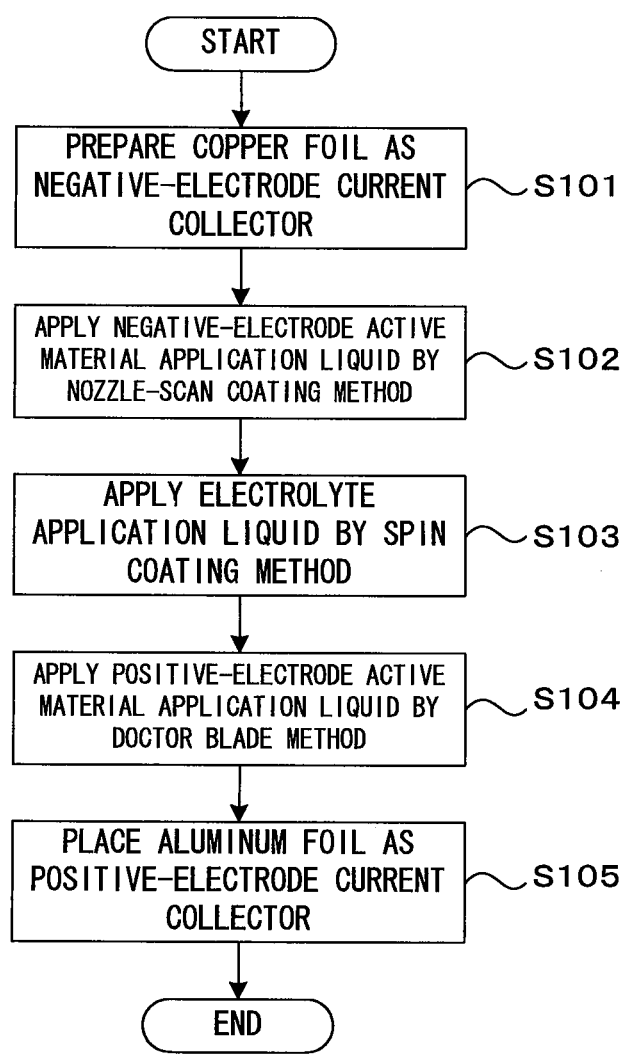
FIG. 2 is a flow chart which shows a module manufacturing method according to the first embodiment.

FIG. 2 is a flow chart which shows a module manufacturing method according to the first embodiment. In this manufacturing method, a metal foil, e.g. a copper foil, which will become the negative-electrode current collector 11, is prepared (Step S101). Since a thin copper foil is difficult to transport and handle, it is preferable to improve transportability, for example, by attaching one surface of the copper foil to a carrier such as a glass plate.

Subsequently, an application liquid containing a negative-electrode active material (a first application liquid) is applied to one surface of the copper foil by a nozzle dispensing method, in particular, by a nozzle-scan coating method for relatively moving a nozzle for dispensing an application liquid with respect to an application target surface (Step S102). A mixture of the above negative-electrode active material, acetylene black as a conduction aid, polyvinylidene fluoride (PVDF) as a binder, N-methylpyrrolidone (NMP) as a solvent and the like can be, for example, used as the application liquid.

Figure 3A:
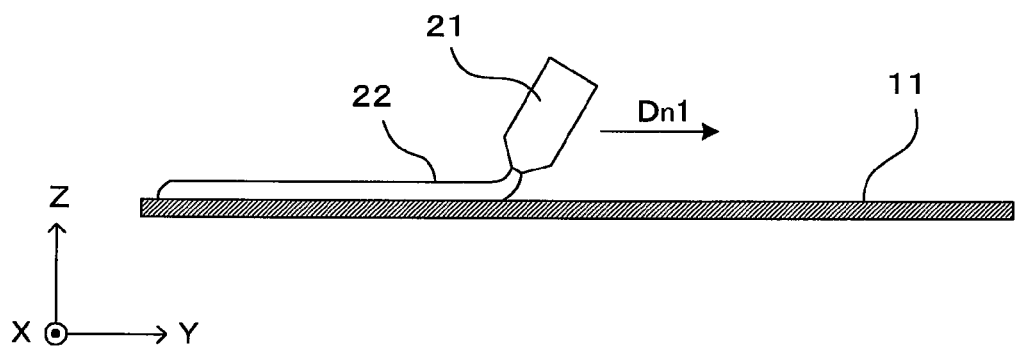
FIGS. 3A and 3B are drawings which diagrammatically show a state of material application by the nozzle-scan coating method.
Figure 3B:
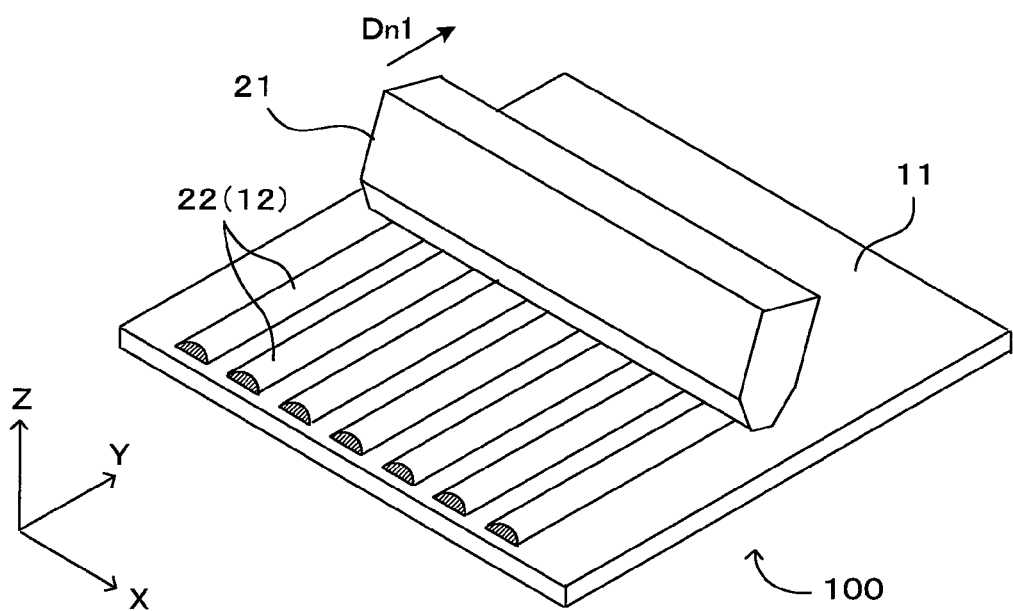

FIGS. 3A and 3B are drawings which diagrammatically show a state of material application by the nozzle-scan coating method. More specifically, FIG. 3A is the drawing which shows the state of application by the nozzle-scan coating method when viewed laterally, and FIG. 3B is the drawing which shows the same state when viewed obliquely from above. A technology for applying an application liquid to a base material by the nozzle-scan coating method is known and such a known technology can be applied also in this method, wherefore an apparatus construction is not described.

In the nozzle-scan coating method, a nozzle 21 perforated with one or more dispense openings (not shown) for dispensing the application liquid is arranged above a copper foil 11 and relatively moved at a constant speed in an arrow direction Dn1 with respect to the copper foil 11 while dispensing a fixed amount of an application liquid 22 from the dispense opening(s). By doing so, the application liquid 22 is applied onto the copper foil 11 in a stripe in the Y-direction. If the nozzle 21 includes a plurality of dispense openings, a plurality of stripes can be formed by one movement. By repeating this movement according to need, the application liquid can be applied in stripes on the entire surface of the copper foil 11. By drying and curing the application liquid, the negative-electrode active material layer 12 is formed on the upper surface of the copper foil 11. A photo-curable resin may be added to the application liquid and the application liquid may be cured by light irradiation after application.

At this point of time, the active material layer 12 is raised on the substantially flat surface of the copper foil 11. Thus, as compared with the case where the application liquid is applied to have a flat upper surface, a surface area can be increased with respect to the used amount of the active material. Therefore, the area of the surface facing the positive-electrode active material layer to be formed later can be increased to obtain a high output.

The flow chart of FIG. 2 is further described. An electrolyte application liquid (a second application liquid) is applied onto the upper surface of the laminated body 100, which is formed by laminating the negative-electrode active material layer 12 on the copper foil 11, by a spin coating method (Step S103). A mixture of a resin as the above polymer electrolyte material such as polyethylene oxide and polystyrene, a supporting salt such as $LiPF_6$ (lithium hexafluorophosphate) and a solvent such as diethylene carbonate can be, for example, used as the electrolyte application liquid.

Figure 4:
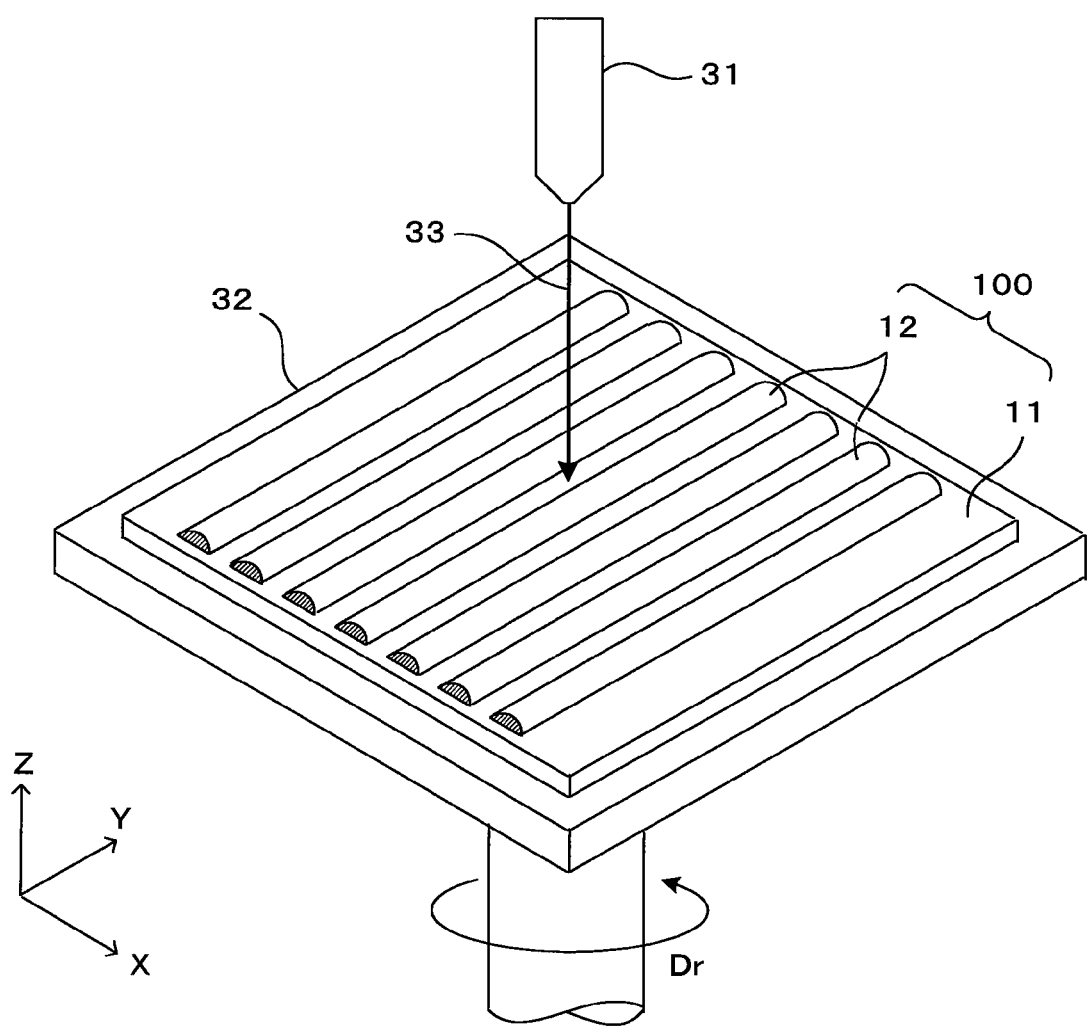
FIG. 4 is a drawing which diagrammatically shows a state of material application by the spin coating method.

FIG. 4 is a drawing which diagrammatically shows a state of material application by the spin coating method. The laminated body 100 formed by laminating the negative-electrode active material layer 12 and the copper foil 11 is substantially horizontally placed on a rotary stage 32 rotatable in a specified rotational direction Dr about a rotary shaft extending in a vertical direction (Z-direction). Then, the rotary stage 32 is rotated at a specified rotational speed and an application liquid 33 containing a polymer electrolyte material is dispensed toward the laminated body 100 from a nozzle 31 disposed at a position above the rotary shaft of the rotary stage 32. The application liquid dropped onto the laminated body 100 spreads around by a centrifugal force, whereby the excess liquid is shaken off from an end portion of the laminated body 100. By doing so, the upper surface of the laminated body 100 is covered by a thin and uniform layer of the application liquid, which is dried and cured to form the solid electrolyte layer 13. In the spin coating method, film thickness can be controlled according to the viscosity of the application liquid and the rotational speed of the rotary stage 32. There is a good track record in forming a thin film with a uniform thickness on an object to be processed having an uneven surface structure such as the laminated body 100 of this application in conformity with the uneven surface.

The thickness of the solid electrolyte layer 13 is arbitrarily set, but needs to be such that the positive and negative active material layers are reliably separated and internal resistance is equal to or below a permissible value. In order not to eliminate the significance of the unevenness of the negative-electrode active material layer 12 provided to increase the surface area, the thickness (t13 in FIG. 1A) of the solid electrolyte layer 13 is preferably smaller than a height difference (t12 in FIG. 1A) of the uneven pattern of the negative-electrode active material layer 12.

The flow chart of FIG. 2 is further described. An application liquid containing a positive-electrode active material (a third application liquid) is applied to a laminated body 101 (FIG. 5A), which is formed by laminating the copper foil 11, the negative-electrode active material layer 12 and the solid electrolyte layer 13, by a doctor blade method to form the positive-electrode active material layer 14 (Step S104). A mixture prepared by adding the above conduction aid, binder, solvent and the like to the positive-electrode active material can be, for example, used as the application liquid.

Figure 5A:
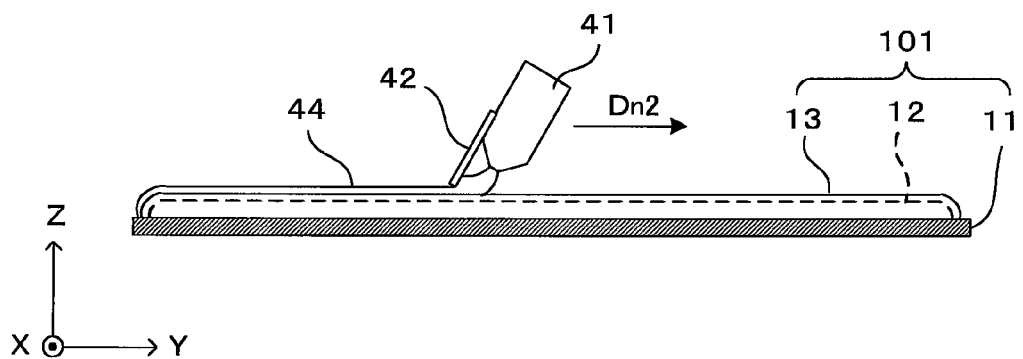
FIGS. 5A and 5B are drawings which diagrammatically show a state of material application by the doctor blade method.
Figure 5B:
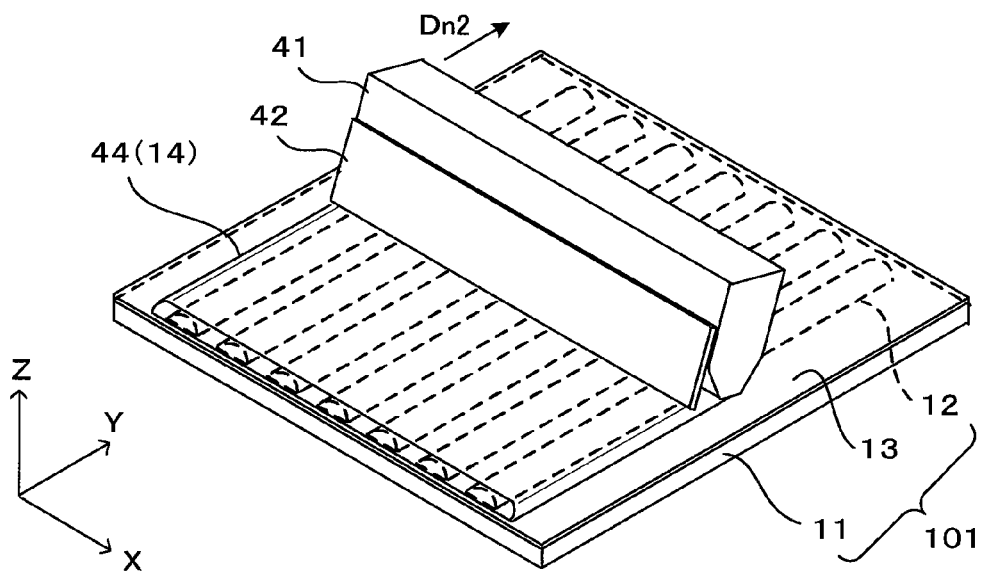

FIGS. 5A and 5B are drawings which diagrammatically show a state of material application by the doctor blade method. More specifically, FIG. 5A is the drawing which shows the state of application by the doctor blade method when viewed laterally, and FIG. 5B is the drawing which shows the same state when viewed obliquely from above. A nozzle 41 for dispensing an application liquid is relatively moved in a direction Dn2 (Y-direction in this example) with respect to the laminated body 101. A doctor blade 42 is mounted on a rear side of the nozzle 41 with respect to the moving direction Dn2 of the nozzle 41. The bottom end of the doctor blade 42 is located above the solid electrolyte layer 13 formed on the upper surface of the laminated body 101 and touches the upper surface of a layer of a dispensed application liquid 44. In this way, the upper surface of the application liquid 44 is leveled.

The nozzle 41 may include a multitude of dispense openings like the nozzle 21 shown in FIG. 3B or may include a slit-like dispense opening extending in a direction (X-direction in this example) orthogonal to the moving direction Dn2.

By applying the application liquid containing the positive-electrode active material to the laminated body in this way, the positive-electrode active material layer 14 whose lower surface is uneven in conformity with the unevenness of the solid electrolyte layer 13 and whose upper surface is substantially flat is formed on the laminated body 101.

Referring back to FIG. 2, a metal foil, e.g. an aluminum foil, which will become the positive-electrode current collector 15, is laminated on the upper surface of the thus formed positive-electrode active material layer 14 (Step S105). At this time, it is preferable to place the positive-electrode current collector 15 on the upper surface of the positive-electrode active material layer 14 formed in previous Step S104 before the positive-electrode active material layer 14 is cured. By doing so, the positive-electrode active material layer 14 and the positive-electrode current collector 15 can be closely bonded to each other. Since the upper surface of the positive-electrode active material layer 14 is even, the positive-electrode current collector 15 can be easily laminated without forming any clearance. In the above manner, the lithium-ion battery module 1 shown in FIG. 1A can be produced.

As described above, in this embodiment, the negative-electrode active material layer 12 is formed by applying the negative-electrode active material application liquid 22 to the negative-electrode current collector 11, the solid electrolyte layer 13 is formed by applying the electrolyte application liquid 33 onto the negative-electrode active material layer 12 and the positive-electrode active material layer 14 is formed by applying the positive-electrode active material application liquid 44 onto the solid electrolyte layer 13. Since the application liquids as the materials for the respective functional layers are successively applied one over another in this way, the lithium-ion battery module 1 can be highly productively produced with a small number of operation steps in a short time.

Here, since application by the nozzle dispensing method is employed to form the negative-electrode active material layer 12 needed to be formed with an uneven pattern, various patterns can be formed in a short time. The nozzle dispensing method can be suitably applied to form a micropattern. In this manufacturing method, the micropattern needs to be formed only in the first application step, i.e. in the application step of the negative-electrode active material application liquid, and in the following application steps, uniform application is sufficient and no micropattern needs to be formed.

The solid electrolyte layer 13 is preferably a thin and uniform film in conformity with the uneven upper surface of the negative-electrode active material layer 12. Accordingly, the spin coating method is applied to form the solid electrolyte layer 13. According to the spin coating method, a thin and uniform film can be formed in a short time by allowing the application liquid 33 to drop while rotating the laminated body as an object to be processed.

Further, the positive-electrode active material layer 14 preferably has the lower surface in conformity the unevenness and the flat upper surface. This purpose is accomplished by employing the doctor blade method for leveling the application liquid 44 by the doctor blade 42. By placing the aluminum foil, which will become the positive-electrode current collector 15, before the thus applied application liquid 44 is cured, the positive-electrode active material layer 14 and the positive-electrode current collector 15 can be closely bonded without forming any clearance.

The lithium-ion battery thus formed is thin and flexible. Since the positive-electrode active material layer and the negative-electrode active material layer face each other in a large area via the thin solid electrolyte layer, a high output can be obtained.

In the above description, a drawing pattern of the negative-electrode active material layer 12 on the negative-electrode current collector 11 has a so-called line-and-space structure composed of a plurality of stripes arranged at regular intervals. However, the drawing pattern is not limited to this and any arbitrary pattern may be used provided that a large surface area of the negative-electrode active material layer 12 can be ensured. For example, the pattern may be as follows.

Figure 6A:
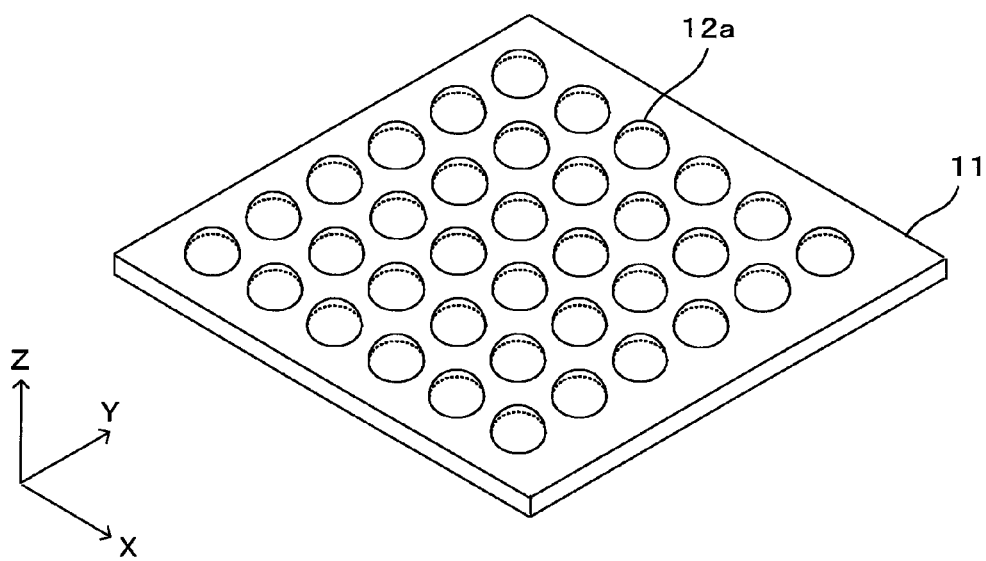
FIGS. 6A and 6B are drawings which show other examples of the drawing pattern on the negative-electrode.
Figure 6B:
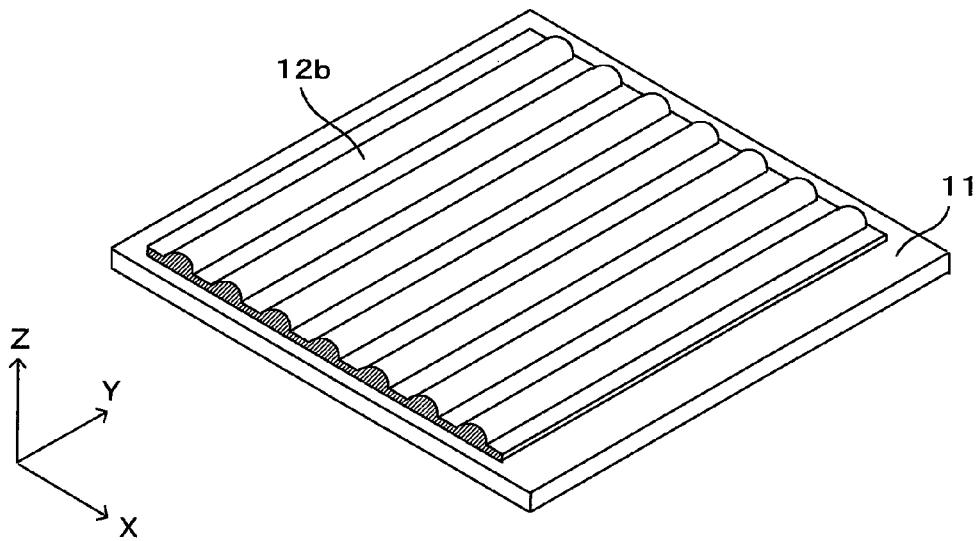

FIGS. 6A and 6B are drawings which show other examples of the drawing pattern on the negative-electrode active material layer. In the example of FIG. 6A, a negative-electrode active material layer 12*a* is formed on the negative-electrode current collector 11 by arranging a multitude of thick dot-like masses of an active material independent of each other. In the example of FIG. 6B, a thin layer of an active material is applied also around stripes of a negative-electrode active material extending in the Y-direction, so that a negative-electrode active material layer 12*b* has such a structure that the respective stripes are connected to each other. The negative-electrode active material layer may have such patterns.

Any of these patterns can be formed by the nozzle dispensing method for dispensing the application liquid from the nozzle. In the nozzle dispensing method, the dispensed amount and viscosity of the application liquid from the nozzle and the scanning speed of the nozzle can be variously set, whereby the widths and thicknesses of applied layers and an interval therebetween can be easily controlled. Thus, as compared with the manufacturing method employing the ink-jet method for forming a space structure by recoating thin layers, a battery can be produced with higher productivity.

As described above, in this embodiment, the copper foil as the negative-electrode current collector 11 corresponds to a "base material" of the invention. Further, the negative-electrode active material corresponds to a "first active material" of the invention and the negative-electrode active material layer 12 to a "first active material layer" of the invention. Accordingly, Step S102 of FIG. 2 corresponds to a "first active material layer forming step" of the invention. Further, in this embodiment, the nozzle 21 functions as a "first nozzle" of the invention.

Further, the solid electrolyte layer 13 corresponds to an "electrolyte layer" of the invention and Step S103 of FIG. 2 to an "electrolyte layer forming step" of the invention. The positive-electrode active material and the positive-electrode active material layer 14 correspond to a "second active material" and a "second active material layer" of the invention, and Step S104 of FIG. 4 to a "second active material layer forming step" of the invention. Further, the aluminum foil as the positive-electrode current collector 15 corresponds to a "conductive layer" of the invention and Step S105 of FIG. 2 to a "current collector laminating step" of the invention.

Second Embodiment

Figure 7A:
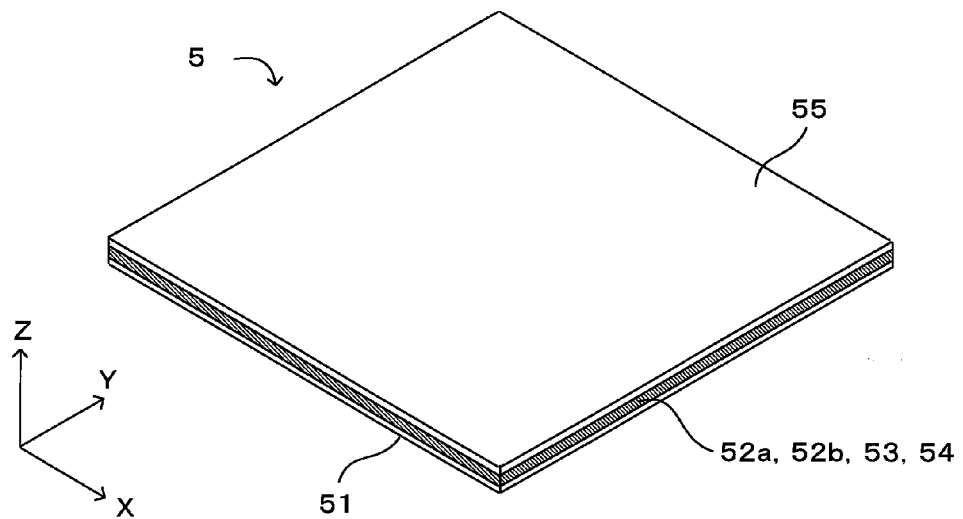
FIGS. 7A and 7B are drawings which show a schematic structure of a second embodiment of the lithium-ion battery.
Figure 7B:
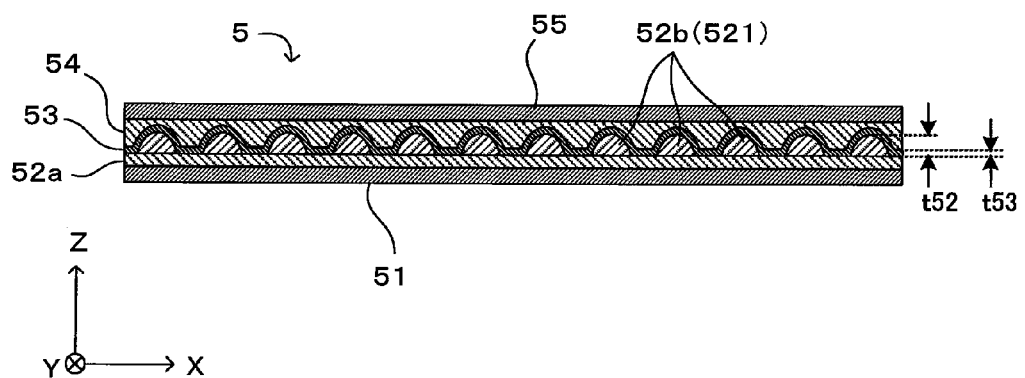

FIGS. 7A and 7B are drawings which show a schematic structure of a second embodiment of the lithium-ion battery. More specifically, FIG. 7A is the drawing which shows a lithium-ion battery module 5 as an example of a battery produced by a second embodiment of the manufacturing method according to this invention. FIG. 7B is the drawing which shows a cross-sectional structure of this battery module 5. The battery module 1 of the first embodiment is structured such that the negative-electrode active material layer 12 is directly formed on the surface of the negative-electrode current collector 11 as the base material, whereas a negative-electrode current collector 51 having one surface entirely covered by a flat layer 52*a* of a negative-electrode active material is used as the base material and a negative-electrode active material layer 52*b* having a line-and-space structure is formed on a surface of this flat layer 52*a* in this second embodiment.

In other words, this lithium-ion battery module 5 has such a structure that the substantially flat and continuous negative-electrode active material layer 52*a*, the negative-electrode active material layer 52*b* made up of a plurality of linear pattern elements 521 separated from each other, a solid electrolyte layer 53, a positive-electrode active material layer 54 and a positive-electrode current collector 55 are successively laminated on the negative-electrode current collector 51. Similar to the first embodiment, X-, Y- and Z-coordinate directions are respectively defined as shown in FIG. 7A.

The negative-electrode active material layer 52*b* has such line-and-space structure that a multitude of linear pattern elements extending in a Y-direction are spaced at regular intervals in an X-direction. On the other hand, the solid electrolyte layer 53 is a continuous thin film having a substantially constant thickness and formed by a solid electrolyte. The solid electrolyte layer 53 uniformly covers substantially the entire upper surface of a laminated body, in which the negative-electrode active material layers 52*a*, 52*b* are formed on the negative-electrode current collector 51 as described above, in such a manner as to conform to the uneven surface of the laminated body.

The positive-electrode active material layer 54 has a lower surface having an uneven structure in conformity with the uneven upper surface of the solid electrolyte layer 53 and a substantially flat upper surface. The positive-electrode current collector 55 is laminated on the upper surface of positive-electrode active material layer 54 formed to be substantially flat in this way, whereby the lithium-ion battery module 5 is formed.

Here, the same materials as in the above first embodiment can be used as materials for the respective layers. However, as described in detail later, the negative-electrode active material layers 52a, 52b are made of active materials which have the same or substantially the same composition, but containing particles having different specific surface areas. In the following description, the following terms are used to distinguish two kinds of negative-electrode active materials and active material layers. The negative-electrode active material layer 52a and the active material forming this layer are respectively called a "first negative-electrode active material layer" and a "first negative-electrode active material". Further, the negative-electrode active material layer 52b and the active material forming this layer are respectively called a "second negative-electrode active material layer" and a "second negative-electrode active material". Next, a method for producing the above lithium-ion battery module 5 is described.

Figure 8:
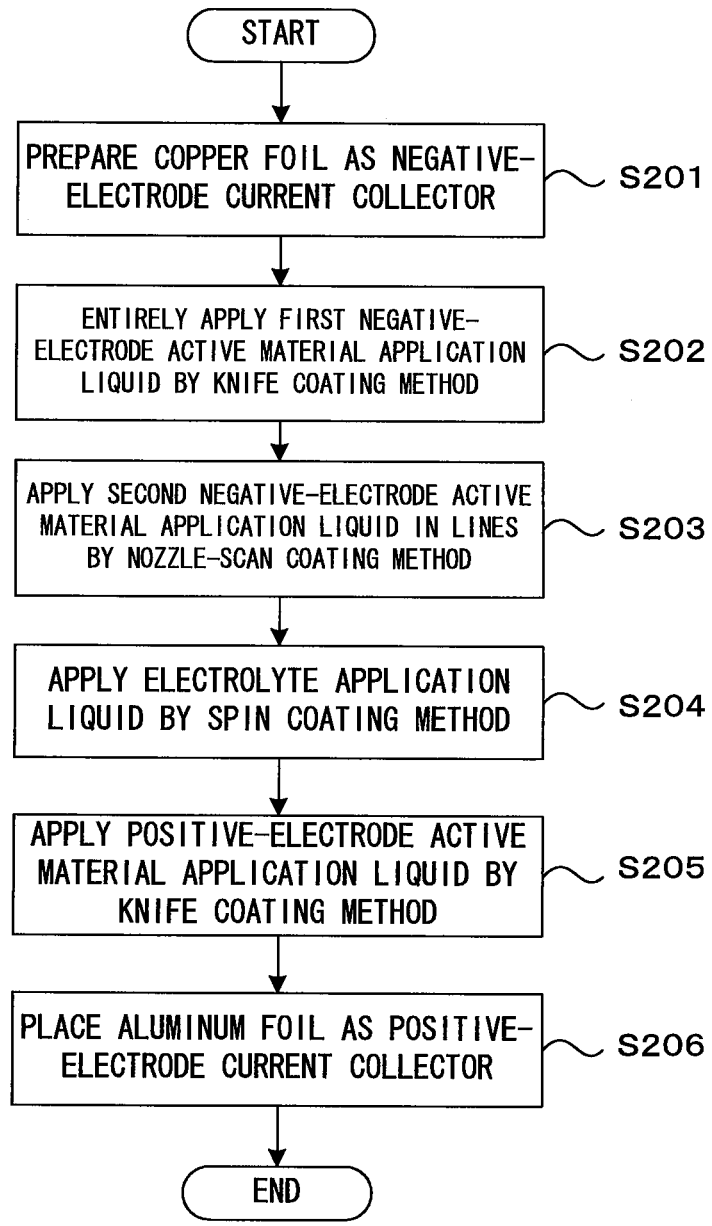
FIG. 8 is a flow chart which shows a module manufacturing method according to the second embodiment.

FIG. 8 is a flow chart which shows a module manufacturing method according to the second embodiment. In this manufacturing method, a metal foil, e.g. a copper foil, which will become the negative-electrode current collector 51, is prepared (Step S201). Since a thin copper foil is difficult to transport and handle, it is preferable to improve transportability, for example, by attaching one surface of the copper foil to a carrier such as a glass plate.

Subsequently, a first negative-electrode active material application liquid containing the first negative-electrode active material (a fourth application liquid) is applied to one surface of the copper foil by a suitable application method, e.g. a knife coating method (Step S202). The "first negative-electrode active material" is a particulate negative-electrode active material having the composition illustrated above and particles thereof have a relatively large specific surface area. For example, lithium titanate described above and having a specific surface area of 10 $m^2/g$ to 20 $m^2/g$ or more is preferable. Its particle diameter is preferably about 1 μm to 7 μm, but the particle diameter may be larger, e.g. 10 μm to 20 μm or larger. A mixture of, for example, acetylene black as a conduction aid, polyvinylidene fluoride (PVDF) as a binder, N-methylpyrrolidone (NMP) as a solvent and the like in addition to this first negative-electrode active material can be used as the application liquid.

FIG. 9 is a drawing which diagrammatically shows a state of application of the first negative-electrode active material by the knife coating method. A coating applicator (knife coater) for applying the application liquid by the knife coating method includes a dispensing nozzle movable in the X-direction and adapted to dispense the first negative-electrode active material application liquid, a knife-shaped blade 62 for leveling the application liquid dispensed from the dispensing nozzle 61 along a surface of the negative-electrode current collector 51, and a moving mechanism 64 for horizontally moving a supporting block 63 supporting the blade 62 in the Y-direction. When the dispensing nozzle 61 moving in the X-direction dispenses the first negative-electrode active material application liquid onto the negative-electrode current collector 51, the blade 62 supported such that the bottom end thereof is at a specified gap to the surface of the negative-electrode current collector 51 horizontally moves in the Y-direction together with the supporting block 63 by the operation of the moving mechanism 64. By doing so, the application liquid is leveled on the negative-electrode current collector 51, thereby forming a laminated body in which the thin and uniform first negative-electrode active material layer 52a is formed on the upper surface of the negative-electrode current collector 51. A knife coater disclosed, for example, in JP07-028997A can be used as the knife coater.

Note that the method for forming the first negative-electrode active material layer 52a is not limited to the above knife coating method and may be, for example, the doctor blade method illustrated in the first embodiment. Besides these, various known coating applicators suitable for forming a thin and smooth film such as a curtain coater, a fountain coater (die coater), a bar coater and a spin coater can be, for example, applied. Further, as described below, application may be performed using a nozzle dispensing method, particularly a nozzle-scan coating method for relatively moving a nozzle for dispensing an application liquid and an application target.

Figure 10:
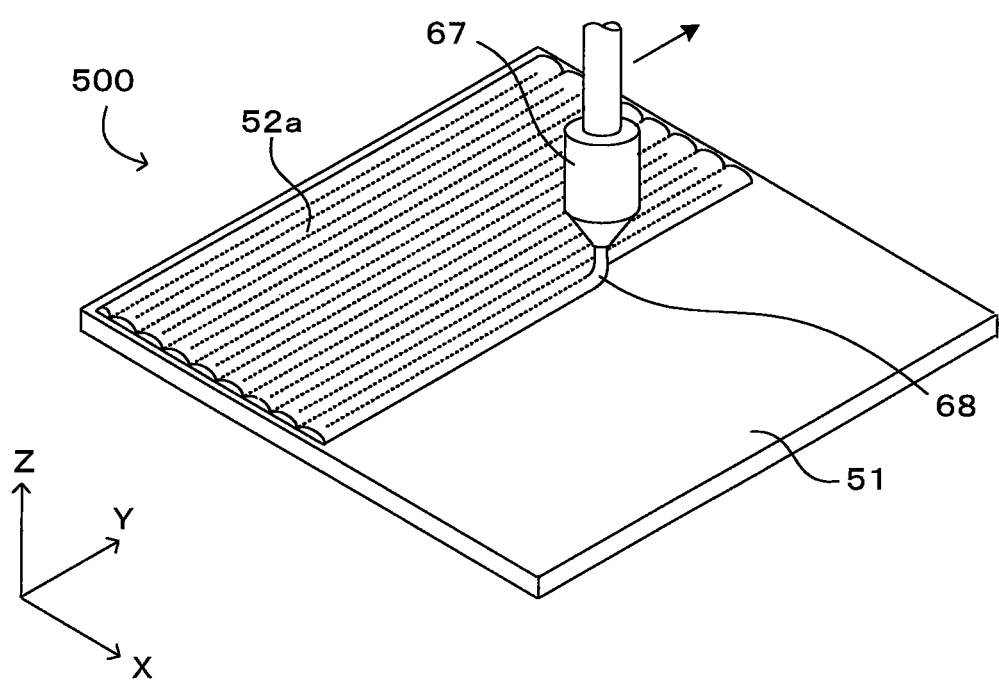
FIG. 10 is a drawing diagrammatically shows a state of application of the first negative-electrode active material application liquid by the nozzle-scan coating method.

FIG. 10 is a drawing diagrammatically shows a state of application of the first negative-electrode active material application liquid by the nozzle-scan coating method. In the application by the nozzle-scan coating method, a dispensing nozzle 67 for continuously dispensing the first negative-electrode active material application liquid is shifted little by little in the X-direction for each scanning movement while being reciprocated in the Y-direction on the negative-electrode current collector 51. At this time, a feed pitch of the dispensing nozzle 67 in the X-direction is set substantially equal to the width of the application liquid 68 dispensed from the dispensing nozzle 67. The diameter of a dispense opening of the dispensing nozzle 67 can be set, for example, at about 0.2 mm to 1 mm. By doing so as well, the first negative-electrode active material layer 52a can be formed substantially on the entire surface of the negative-electrode current collector 51.

In this application by the nozzle-scan coating method, a periodical uneven pattern corresponding to the feed pitch of the nozzle may appear on the upper surface of the first negative-electrode active material layer 52a obtained by application, depending on the viscosity and application speed of the application liquid. This presents no demerit in this embodiment, rather brings about the following advantages.

Specifically, as described above, the first negative-electrode active material layer 52a and the second negative-electrode active material layer 52b formed by application later function together as a negative-electrode active material layer and performance of the battery is improved by increasing a surface area by forming this negative-electrode active material layer to have a complicated surface shape in the lithium-ion battery module 5 produced by the manufacturing method of this embodiment. The surface shape becomes more complicated if the upper surface of the first negative-electrode active material layer 52a has an uneven structure as described above, wherefore performance can be further improved by increasing the surface area of the negative-electrode active material layer.

The application liquid applied by the appropriate method in this way is cured by drying or burning, whereby the first negative-electrode active material layer 52a is formed on the upper surface of the copper foil 51 as the negative-electrode current collector. In this way, a laminated body 500 is formed. A photo-curable resin may be added to the application liquid and the application liquid may be cured by light irradiation after application. The thickness of the first negative-electrode active material layer 52a formed in this way is suitably about 50 µm to 100 µm.

By applying the active material having a large specific surface area to form the active material layer 52a, a large effective surface area of the active material layer 52a can be ensured and the performance of the battery can be improved. However, due to a low fluidity in the application liquid containing particles with a relatively large specific surface area, the nozzle 61 or 67 is easily clogged. In order to prevent this, the diameter of the dispense opening of the nozzle is preferably set in consideration of the specific surface area and particle diameter of the active material, for example, preferably set to be at least about ten times as large as the particle diameter of the negative-electrode active material. Further, in order to allow the dispensed liquid to uniformly spread on the copper foil 51, the application liquid is preferably low in viscosity (e.g. 5 Pa·s to 10 Pa·s).

Referring back to FIG. 8, the module manufacturing method according to this embodiment is further described. Subsequently, a second negative-electrode active material application liquid containing the second negative-electrode active material (a third application liquid) is applied to the upper surface of the thus formed active material layer 52a by the nozzle-scan coating method (Step S203). The "second negative-electrode active material" has a composition equivalent to that of the above first negative-electrode active material, but the particles thereof have a smaller specific surface area. For example, lithium titanate having a specific surface area of about 1 m²/g to 5 m²/g can be used. The particle diameter suitable for continuous dispensing from the tiny nozzle is preferably 1 µm to 7 µm. Components other than the active material may be the same as the first active material application liquid, but the application liquid may have a higher viscosity (e.g. 50 Pa·s to 100 Pa·s). Since viscosity tends to be lower for particles with a smaller specific surface area at the same concentration, viscosity can be appropriately adjusted, such as by reducing a solvent component.

Figure 11A:
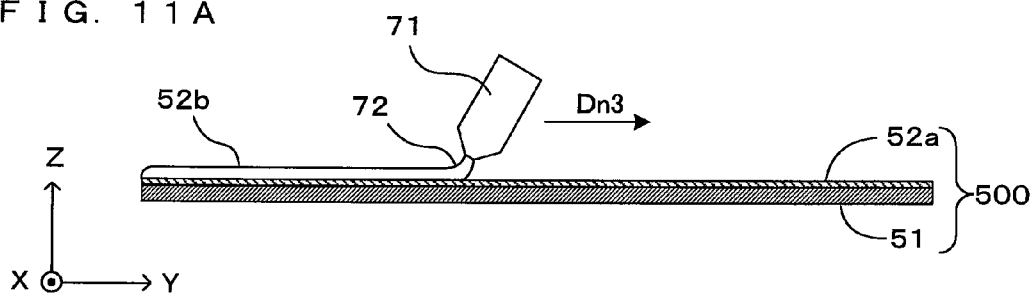
FIGS. 11A, 11B and 11C are drawings diagrammatically show a state of application of the second negative-electrode active material by the nozzle-scan coating method.
Figure 11B:
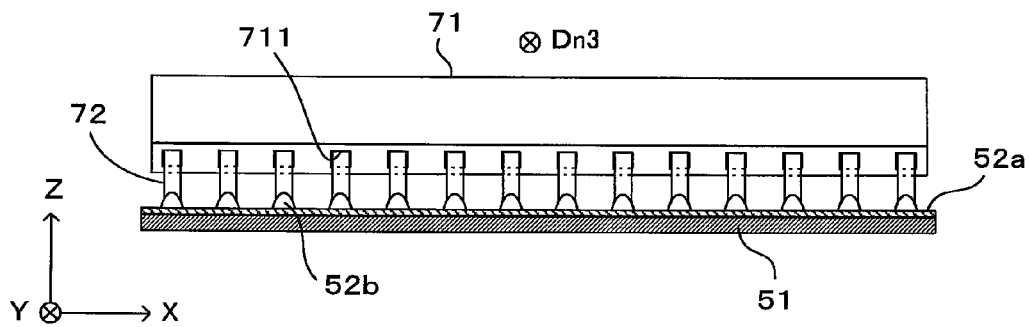
Figure 11C:
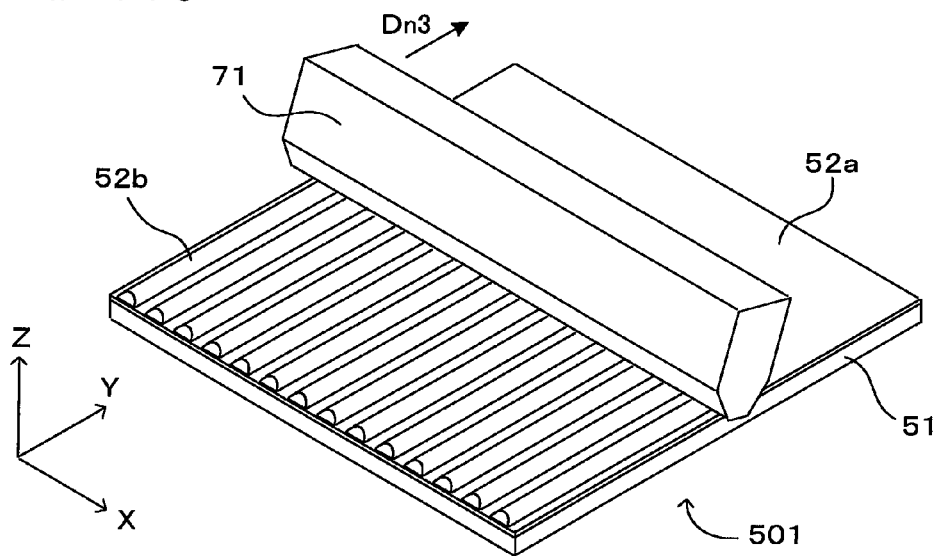

FIGS. 11A, 11B and 11C are drawings diagrammatically show a state of application of the second negative-electrode active material by the nozzle-scan coating method. More specifically, FIG. 11A is the drawing which shows the state of application by the nozzle-scan coating method when viewed in the X-direction, and FIGS. 11B and 11C are respectively the drawings which show the same state when viewed in the Y-direction and obliquely from above. A nozzle 71 used in this process has such a structure that a multitude of dispense openings 711 having a smaller opening area than the nozzle 61 (FIG. 9) or 67 (FIG. 10) for dispensing the first negative-electrode active material application liquid are arranged in the X-direction. A dimension of the dispense openings 711 is preferably about ten times as large as the particle diameter of the second negative-electrode active material, i.e. about 10 µm to 70 µm. By relatively moving the nozzle 71 for dispensing a second negative-electrode active material application liquid 72 in an arrow direction Dn3 with respect to the laminated body 500, the second negative-electrode active material application liquid is applied in lines separated from each other in the X-direction and extending in the Y-direction on the negative-electrode active material layer 52a formed on the copper foil 51. The second negative-electrode active material application liquid is cured by drying, burning or light irradiation, thereby forming a laminated body 501 in which the second negative-electrode active material layer 52b composed of lines is formed on the substantially flat first negative-electrode active material layer 52a.

Since the particles of the second negative-electrode active material contained in the second negative-electrode active material application liquid have a small specific surface area, fluidity is high and there is no likelihood of clogging the dispense openings 711 having a small opening area. Further, the spread of the application liquid after dispensing becomes smaller by using the high-viscosity application liquid, wherefore an uneven pattern with a high ratio of height to width in a cross section, i.e. a high aspect ratio can be formed. Typical dimensions of the second negative-electrode active material layer 52b, e.g. width and height of the respective lines and spaces between the lines can be set at about 20 µm to 100 µm.

At this point of time, the substantially flat first negative-electrode active material layer 52a and the second negative-electrode active material layer 52b having the uneven pattern are placed on the substantially flat surface of the copper foil 51. The first and second negative-electrode active material layers 52a, 52b made of substantially the same material function together as the negative-electrode active material layer. In this case, as compared with an active material layer having a just flat upper surface, a surface area with respect to the used amount of the active material can be drastically increased, wherefore an area facing the positive-electrode active material to be formed later can be increased to obtain a high output. The surface area can be increased by applying particles having a large specified surface area in the flat first negative-electrode active material layer 52a, whereas the surface area can be increased by forming the uneven pattern while preventing the clogging of the nozzle through the use of particles having a small specific surface area in the second negative-electrode active material layer 52b.

Referring back to FIG. 8 again, the flow chart is further described. An electrolyte application liquid is applied to the upper surface of the thus formed laminated body 501, for example, by a spin coating method (Step S204). An application liquid similar to that in the above first embodiment can be used as the electrolyte application liquid.

Figure 12:
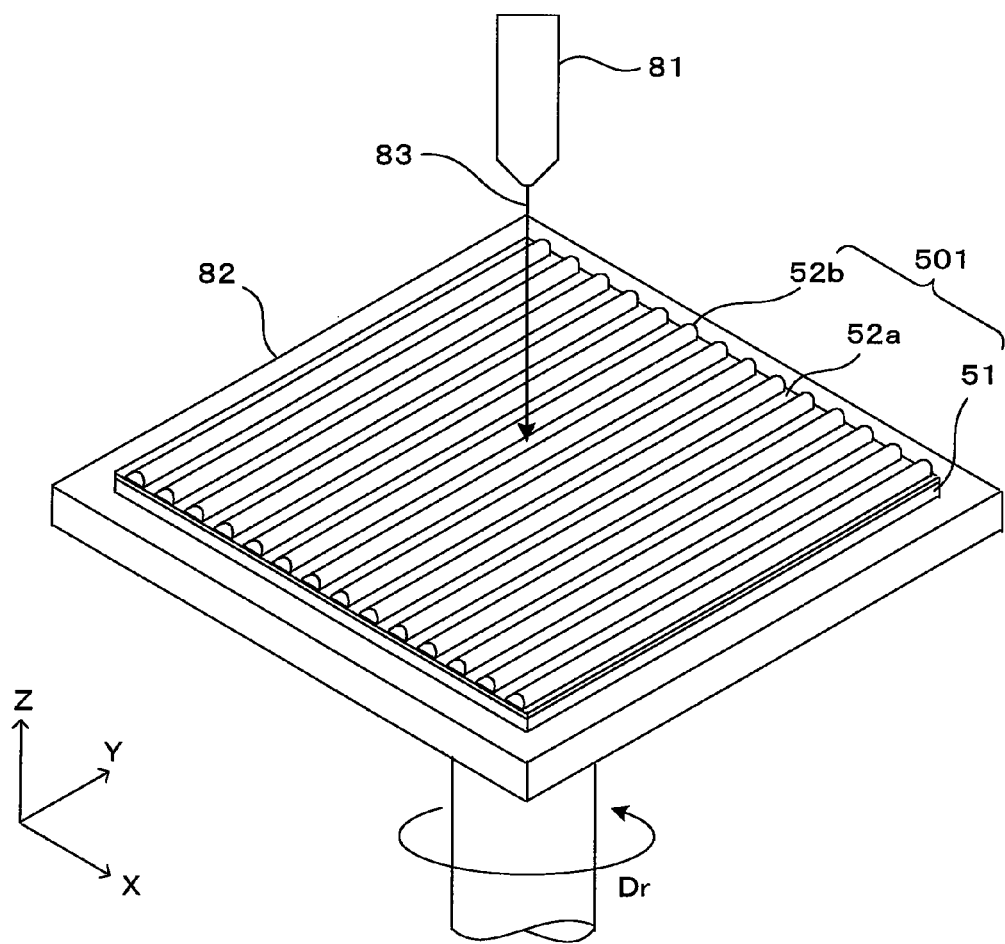
FIG. 12 is a drawing which diagrammatically shows a state of material application by the spin coating method.

FIG. 12 is a drawing which diagrammatically shows a state of material application by the spin coating method. The laminated body 501 formed by laminating the first and second negative-electrode active material layers 52a, 52b on the copper foil 51 is substantially horizontally placed on a rotary stage 82 rotatable in a specified rotational direction Dr about a rotary shaft extending in a vertical direction (Z-direction). Then, the rotary stage 82 is rotated at a specified rotational speed and an application liquid 83 containing a polymer electrolyte material is dispensed toward the laminated body 501 from a nozzle 81 disposed at a position above the rotary shaft of the rotary stage 82. The application liquid dropped onto the laminated body 501 spreads around by a centrifugal force, whereby the excess liquid is shaken off from an end portion of the laminated body 501. By doing so, the upper surface of the laminated body 501 is covered by a thin and uniform layer of the application liquid, which is cured to form the solid electrolyte layer 53.

The thickness of the solid electrolyte layer 53 is arbitrarily set, but similar to the first embodiment, the thickness (t53 in FIG. 7B) of the solid electrolyte layer 53 is preferably smaller than a height difference (t52 in FIG. 7B) of the uneven pattern of the negative-electrode active material layer 52b.

The flow chart of FIG. 8 is further described. An application liquid containing a positive-electrode active material is applied to a laminated body 502 (FIG. 13), which is formed by laminating the copper foil 51, the negative-electrode active material layers 52a, 52b and the solid electrolyte layer 53, by an appropriate method, e.g. the knife coating method used to form the first negative-electrode active material layer 52a, thereby forming the positive-electrode active material layer 54 (Step S205). The application liquid used may be, for example, similar to the one of the first embodiment.

FIG. 13 is a drawing which diagrammatically shows a state of application of the positive-electrode active material by the knife coating method. The application liquid containing the positive-electrode active material is dispensed from an unillustrated nozzle to a surface of the laminated body 502 formed by laminating the negative-electrode current collector 51, the first and second negative-electrode active material layers 52a, 52b and the solid electrolyte layer 53. Then, a blade 92 is moved in an arrow direction Dn4 on the upper surface of the laminated body 502 while the bottom end thereof touches the application liquid. In this way, the upper surface of the application liquid 94 is leveled.

By applying the application liquid 94 containing the positive-electrode active material to the laminated body 502 while leveling the application liquid 94 by the blade 92 in this way, the positive-electrode active material layer 54 whose lower surface is uneven in conformity with the unevenness of the solid electrolyte layer 53 and whose upper surface is substantially flat is formed on the laminated body 502. An appropriate thickness of the positive-electrode active material layer 54 is about 20 μm to 100 μm, which is equivalent to that of the second negative-electrode active material layer 52b.

Referring back to FIG. 8, a metal foil, e.g. an aluminum foil, which will become the positive-electrode current collector 55, is laminated on the upper surface of the thus formed positive-electrode active material layer 54 (Step S206). Similar to the first embodiment, the positive-electrode current collector 55 is preferably placed on the upper surface of the positive-electrode active material layer 54 formed in previous Step S205 before the positive-electrode active material layer 54 is cured. By doing so, the positive-electrode active material layer 54 and the positive-electrode current collector 55 can be closely bonded to each other. Since the upper surface of the positive-electrode active material layer 54 is leveled, the positive-electrode current collector 55 can be easily laminated without forming any clearance. In the above manner, the lithium-ion battery module 5 shown in FIG. 7A can be produced.

As described above, in this embodiment, after the first positive-electrode active material application liquid is applied to the entire upper surface of the negative-electrode current collector 51 to form the substantially flat negative-electrode active material layer 52a, the negative-electrode active material layer 52b composed of lines is formed by the nozzle dispensing method. Then, the electrolyte application liquid is applied onto the negative-electrode active material layer 52b to form the solid electrolyte layer 53, and the positive-electrode active material application liquid is applied onto the solid electrolyte layer 53 to form the positive-electrode active material layer 54. Since the application liquids as the materials for the respective functional layers are successively applied one over another in this way, the lithium-ion battery module 5 can be highly productively produced with a small number of operation steps in a short time.

Since the first and second negative-electrode active material layers 52a, 52b have substantially the same composition, these function together as a negative-electrode active material layer having a large surface area. Here, the surface area can be increased by using particles having a large specified surface area in the flat first negative-electrode active material layer 52a, whereas the surface area can be increased by forming the minute uneven pattern by arranging a multitude of lines in the second negative-electrode active material layer 52b. By dispensing the first negative-electrode active material application liquid containing the particles having a large specific surface area from the nozzle 61 or 67 including the dispense opening having a large opening area and dispensing the second negative-electrode active material application liquid containing the particles having a small specific surface area from the nozzle 71 including the dispense openings 711 having a small opening area, the negative-electrode active material layer having a large surface area can be formed with high productivity without causing the clogging of the nozzle in any case.

Here, since application by the nozzle dispensing method is employed to form the negative-electrode active material layer 52b needed to be formed with the uneven pattern, various patterns can be formed in a short time. The nozzle dispensing method can be suitably applied also to form micropatterns. In this manufacturing method, the micropattern needs to be formed only in the application step of the second negative-electrode active material application liquid, and in the following application steps, uniform application is sufficient and no micropattern needs to be formed.

The solid electrolyte layer 53 is preferably a thin and uniform film in conformity with the unevenness of the upper surface of the negative-electrode active material layer 52a, 52b. Accordingly, the spin coating method is applied to form it. According to the spin coating method, a thin and uniform film can be formed in a short time by allowing the application liquid 83 to drop while rotating the laminated body 501 as an object to be processed.

Further, the positive-electrode active material layer 54 preferably has the lower surface in conformity the unevenness and the flat upper surface. This purpose is accomplished by applying the knife coating method for leveling the application liquid 94 by the blade 92. By placing the aluminum foil, which will become the positive-electrode current collector 55, before the thus applied application liquid 94 is cured, the positive-electrode active material layer 54 formed by curing the application liquid 94 and the positive-electrode current collector 55 can be closely bonded without forming any clearance.

The lithium-ion battery thus formed is thin and flexible. Since the positive-electrode active material layer and the negative-electrode active material layer face each other in a large area via the thin solid electrolyte layer, a high output can be obtained.

As described above, in this embodiment, the laminated body 500 formed by laminating the first negative-electrode active material layer 52a having a large specific surface area on the copper foil as the negative-electrode current collector 51 corresponds to the "base material" of the invention. Further, the first negative-electrode active material having a large specific surface area out of the negative-electrode active materials corresponds to a "third active material" of the invention, and the first negative-electrode active material layer 52a to a "third active material layer" of the invention. Accordingly, Step S202 of FIG. 8 corresponds to a "third active material layer forming step" of the invention. In this embodiment, the nozzles 61, 67 function as a "second nozzle" of the invention, whereas the nozzle 71 functions as a "third nozzle" of the invention.

Further, in this embodiment, the second negative-electrode active material having a small specific surface area corresponds to the "first active material" and the second negative-electrode active material layer 52b to the "first active material layer" of the invention. Accordingly, Step S203 of FIG. 8 corresponds to the "first active material layer forming step" of the invention.

Further, the solid electrolyte layer 53 corresponds to the "electrolyte layer" of the invention, and Step S204 of FIG. 8 to the "electrolyte layer forming step" of the invention respectively. Further, the positive-electrode active material and the positive-electrode active material layer 54 correspond to the "second active material" and the "second active material layer" of the invention, and Step S205 of FIG. 8 to the "second active material layer forming step" of the invention. Furthermore, the aluminum foil as the positive-electrode current collector 55 corresponds to a "current collector layer" of the invention and Step S206 of FIG. 8 to a "current collector laminating step" of the invention.

<Miscellaneous>

The invention is not limited to the above embodiments and various changes other than the above can be made without departing from the gist of the invention. For example, the application methods applied in the respective operation steps are not limited to the above, and other application methods may be applied if they fulfill the purposes of these operation steps. For example, although the spin coating method is applied to form the solid electrolyte layers 13, 53 in the above respective embodiments, the application liquid containing the polymer electrolyte may be applied by another method capable of forming a thin film which conforms to the unevenness of the application target surface, e.g. by a spray coating method.

Further, although the doctor blade method and the knife coating method are respectively applied to form the positive-electrode active material layers 14, 54 in the above first and second embodiments, any other application method may be applied if this method can finish the positive-electrode active material layer such that the lower surface touching the application target surface can conform to the unevenness and the upper surface is substantially flat. In order to accomplish such a purpose, the viscosity of the application liquid is preferably not too high. In other words, the positive-electrode active material layer can be finished such that the lower surface can conform to the unevenness and the upper surface is substantially flat even without using a doctor blade or a knife by appropriately selecting the viscosity of the application liquid. For example, application may be performed by a nozzle-scan coating method, a slit coating method or a bar coating method and the like.

For example, the particles having a large specific surface area are used as the first active material and the particles having a small specific surface area are used as the second active material in the above second embodiment. However, without being limited to this, these active materials may be, for example, same.

Although the first negative-electrode active material layer 52a is preferably formed to continuously cover the substantially entire surface of the copper foil 51, i.e. so as not to expose the surface of the copper foil in the above second embodiment, it is not an essential requirement that the first negative-electrode active material layer 52a be flat. Accordingly, the first negative-electrode active material layer 52a itself may be more actively formed to have a surface shape with an uneven pattern. By doing so, the surface area of the negative-electrode active material layer formed by uniting the first and second negative-electrode active material layers can be further increased. Here, if the first negative-electrode active material layer 52a has an uneven pattern composed of lines, an extending direction and an arrangement pitch of the lines may be different from those of the second negative-electrode active material layer 52b. By doing so, the surface shape of the negative-electrode active material layer as a whole becomes more complicated and the surface area thereof can be increased.

In the above respective embodiments, the negative-electrode active material layer, the solid electrolyte layer, the positive-electrode active material layer and the positive-electrode current collector are successively laminated on the negative-electrode current collector. However, contrary to this, the positive-electrode active material layer, the solid electrolyte layer, the negative-electrode active material layer and the negative-electrode current collector may be laminated in this order on the positive-electrode current collector.

Since the micropattern needs to be formed only in the first active material layer forming step in this manufacturing method as described above, the layer may be formed by recoating by the ink-jet method as with the prior art only in this operation step and the other layers may be formed as described above in the succeeding operation steps.

The materials such as the current collectors, the active materials and the electrolytes illustrated in the above embodiments are merely examples and there is no limitation to these. Also in the case of producing a lithium-ion battery using other materials used as constituent materials for lithium-ion batteries, the manufacturing method of the invention can be suitably applied. The invention is also applicable to production of chemical batteries (all-solid-state batteries) using other materials without being limited to lithium-ion batteries.

Further. in the battery manufacturing method according to this invention, for example, in the first active material layer forming step, the first application liquid may be dispensed to the surface of the base material from a first nozzle which relatively moves with respect to the surface of the base material. According to such an application method, i.e. a so-called nozzle dispensing method, a considerably larger amount of application liquid can be applied in a short time as compared with an ink-jet method, and the three-dimensional first active material layer can be formed on a wide area of the base material in a short time.

Further, for example, in the first active material layer forming step, the first application liquid may be applied in a plurality of lines separated from each other. By doing so, the first active material layer has an uneven structure, a so-called line-and-space structure composed of a plurality of lines separated from each other. Thus, the first active material layer having a large effective surface area can be formed by a relatively simple application step. Therefore, a high-performance and low-cost battery can be provided.

In this invention, the base material may be a current collector corresponding to the first active material or a laminated body in which a third active material layer containing a third active material having the same polarity as the first active material is formed on a surface of the current collector. For example, in the case of forming the first active material layer having a line-and-space structure on a surface of the current collector, a part of the current collector surface is exposed without being covered by the first active material layer. This could cause a reduction in battery capacity. However, if the first active material layer is formed on the surface of the laminated body in which the third active material layer is formed on the current collector, battery capacity can be increased by avoiding the exposure of the current collector surface.

In order to obtain such a structure, the first application liquid may be applied to the surface of the base material at a side, where the third active material layer is formed, in the first active material layer forming step. By doing so, the first active material and the third active material function together as an active material having one polarity, wherefore a battery with higher performance can be produced by increasing the volume and surface area of the active material layer having this polarity.

Here, the first active material and the third active material may have the same or substantially the same composition. By doing so, an interface between the first active material layer and the third active material layer substantially disappears and both function together as an active material layer having one polarity. For example, a material having the same composition as the first active material and having a larger specific surface area can be used as the third active material. By doing so, the area of the active material layer can be increased by the large specific surface area of the third active material itself in the third active material layer and by the uneven pattern in the first active material layer.

In order to improve performance of a battery by increasing an effective surface area of an active material layer, it is preferable to use particles having a large specific surface area as the active material. On the other hand, since a material having a large specific surface area has a low fluidity, it is difficult to apply an application liquid containing such a material in a micropattern. For example, in the case of applying the application liquid by dispensing it from a tiny nozzle, the particles having a large specific surface area cause clogging of the nozzle to reduce productivity. In view of this problem, a flat layer may be made of the third active material having a relatively large specific surface area, whereas a layer having an uneven pattern may be made of the first active material having a smaller specific surface area. In this way, battery performance can be improved by forming an active material layer having a large surface area while ensuring good productivity.

Upon forming the third active material layer, a third active material layer forming step of forming the third active material layer on the surface of the current collector by dispensing a fourth application liquid containing the third active material from a dispense opening of a second nozzle for third active material which includes the dispense opening having a larger opening area than a dispense opening of a third nozzle for dispensing the first application liquid and relatively moves with respect to the surface of the current collector maybe executed. Various known forming methods can be applied as a method for forming the third active material layer. For example, the third active material layer can be formed by relatively moving the second nozzle for dispensing the fourth application liquid with respect to the base material. In this case, by using the second nozzle including the dispense opening having a large opening area, even the application liquid containing the active material having a large specific surface area can be applied without causing clogging.

For example, in the second active material layer forming step, the third application liquid may be applied by a knife coating method, a doctor blade method, a bar coating method or a slit coating method. The surface of the second active material layer touching the electrolyte layer needs to have an uneven shape in conformity with the unevenness of the electrolyte layer, whereas the surface opposite to this surface needs not similarly have an uneven shape or is rather preferably flat. This is because the current collector layer needs to be formed on the second active material layer. Therefore, the above method is preferable as an application method which can allow the application liquid to spread in conformity with the uneven shape for the surface touching the electrolyte layer while finishing the flat opposite surface.

For example, in the electrolyte layer forming step, the second application liquid may be applied by a spin coating method or a spray coating method. According to these methods, it is possible to form a thin and uniform thin film in conformity with the unevenness of an application target surface. A solid electrolyte is likely to lead to an increase of internal resistance due to low ion mobility as compared with an electrolytic solution. However, since a thin and uniform solid electrolyte layer is obtained, a reduction in battery performance resulting from the solid electrolyte can be prevented.

The manufacturing method may further comprise a current collector laminating step of laminating a conductive film, which will become a current collector corresponding to the second active material, on a layer of the third application liquid in a state where the third application liquid applied in the second active material layer forming step is not yet cured. By doing so, the second active material layer and the current collector are closely bonded and the current collector can efficiently collect.

In this invention, a thickness of the electrolyte layer may be smaller than a height difference of the uneven pattern of the first active material layer. In order to obtain a high-performance battery, the first and second active material layers are preferably arranged in a wide area and as closely as possible. Here, if the electrolyte layer is formed to be thick, the significance of the uneven pattern provided on the first active material layer to increase the surface area is eliminated and a distance to the second active material layer also increases. Accordingly, the thickness of the electrolyte layer is preferably smaller than the height difference of the uneven pattern of the first active material layer.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A battery manufacturing method, comprising:
a first active material layer forming step of forming a first active material layer having a specified uneven pattern by applying a first application liquid containing a first active material on a surface of a base material to form a laminated body;
an electrolyte layer forming step of forming an electrolyte layer having unevenness substantially in conformity with said uneven pattern on said surface of said laminated body, which is formed by laminating the first active material layer on the surface of the base material, by applying a second application liquid containing a polymer electrolyte onto a surface of the laminated body, at a side where the first active material layer is formed, after the first active material layer forming step; and
a second active material layer forming step of forming a second active material layer having a substantially flat surface opposite to a surface touching the electrolyte layer by applying a third application liquid containing a second active material on a surface of the electrolyte layer after the electrolyte layer forming step, wherein
the first active material layer forming step is executed by a nozzle-scan method, in which a nozzle having a plurality of dispense openings arranged in a row in a first direction each of which dispenses a fixed amount of the first application liquid is moved relative to the surface of the base material so that the first application liquid is applied onto the base material in stripes arranged in a second direction orthogonal to the first direction, thereby forming a plurality of separated stripes of the first active material by one said movement of the nozzle.

2. The battery manufacturing method according to claim 1, wherein:
in laminated body, a third active material layer containing a third active material having the same polarity as the first active material is formed on a surface of a current collector; and
in the first active material layer forming step, the first application liquid is applied to the surface of the base material, at a side where the third active material layer is formed.

3. The battery manufacturing method according to claim 2, wherein the first active material and the third active material have the same or substantially the same composition.

4. The battery manufacturing method according to claim 2, wherein the third active material has a specific surface area larger than a specific surface area of the first active material.

5. The battery manufacturing method according to claim 4, further comprising a third active material layer forming step, before the first active material layer forming step, of forming the third active material layer by dispensing a fourth application liquid containing the third active material to the surface of the current collector from a second nozzle which relatively moves with respect to the surface of the current controller, wherein:
in the first active material layer forming step, the first application liquid is dispensed to the surface of the base material from a third nozzle which relatively moves with respect to the surface of the base material; and
a dispense opening of the second nozzle has a larger opening area than a dispense opening of the third nozzle.

6. The battery manufacturing method of claim 2, wherein the first application liquid is applied onto a substantially flat surface of the third active material layer.

7. The battery manufacturing method according to claim 1, wherein in the second active material layer forming step, the third application liquid is applied by a knife coating method, a doctor blade method, a bar coating method or a slit coating method.

8. The battery manufacturing method according to claim 1, wherein in the electrolyte layer forming step, the second application liquid is applied by a spin coating method or a spray coating method.

9. The battery manufacturing method according to claim 1, further comprising a current collector laminating step of laminating a conductive film, which will become a current collector corresponding to the second active material, on a layer of the third application liquid in a state where the third application liquid applied in the second active material layer forming step is not yet cured.

10. The battery manufacturing method according to claim 1, wherein a thickness of the electrolyte layer is smaller than a height difference of the uneven pattern of the first active material layer.

11. The battery manufacturing method of claim 1, wherein the base material is a metal which has a flat surface and becomes a current collector.

12. The battery manufacturing method of claim 11, wherein each of stripes or dots of the first active material is independent from other stripes or dots on the base material.

13. The battery manufacturing method of claim 1, wherein the nozzle is moved relative to the base material at a constant speed.

* * * * *